Figure 1:
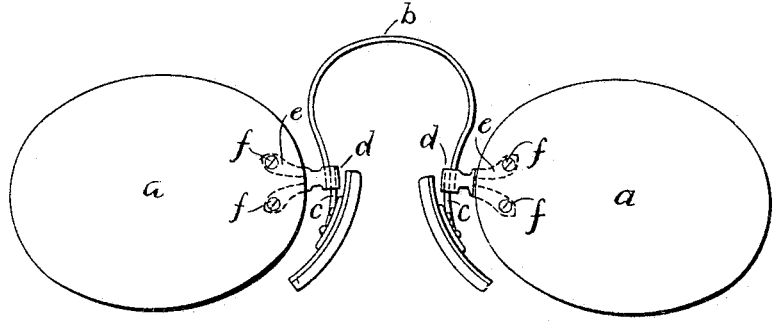

No. 782,287. PATENTED FEB. 14, 1905.
F. A. STEVENS.
EYEGLASSES OR SPECTACLES.
APPLICATION FILED MAY 1, 1903.

WITNESSES
James H. Thurston
Catherine G. Bradley

INVENTOR
Frederick A. Stevens
BY Wilmarth H. Thurston
ATTY

No. 782,287. Patented February 14, 1905.

UNITED STATES PATENT OFFICE.

FREDERICK A. STEVENS, OF PROVIDENCE, RHODE ISLAND, ASSIGNOR OF ONE-HALF TO ALBERT E. LENZ, OF PROVIDENCE, RHODE ISLAND.

EYEGLASSES OR SPECTACLES.

SPECIFICATION forming part of Letters Patent No. 782,287, dated February 14, 1905.

Application filed May 1, 1903. Serial No. 155,101.

*To all whom it may concern:*

Be it known that I, FREDERICK A. STEVENS, of the city and county of Providence and State of Rhode Island, have invented certain new and useful Improvements in Eyeglasses or Spectacles; and I do hereby declare the following specification, taken in connection with the accompanying drawings, forming a part of the same, to be a full, clear, and exact description thereof.

The invention relates more particularly to what are known as "frameless" eyeglasses and spectacles, in which the lenses are secured to the mountings or metallic parts without the employment of rims or frames, the lenses being perforated for the passage of screws, by which the lenses and the metallic parts are secured together.

Heretofore the post in the case of eyeglasses and the bridge-piece in the case of spectacles have usually each been provided with two projecting straps or ears between which the lens was clamped by the screw referred to, said screw passing through the lens and through both of said ears. As only a single screw was employed for each mounting, it was necessary in order to prevent as far as possible any pivotal action or movement of the lens with relation to the mounting to have the edge of the lens bear against the end of the metallic post or bridge-piece. As this bearing was necessarily a narrow one, it was further necessary to provide the mounting with arms or projections extending along and bearing against the periphery of the lens on opposite sides of the mounting, these arms or projections constituting, in effect, a portion of a rim or frame for the lens. As the periphery of the lens was not formed in the arc of a circle described from the axis of the clamping-screw, these projecting arms or rudimentary rims tended to prevent the pivotal movement of the lens about said screw. As said arms, however, were necessarily small and correspondingly weak, they were liable to bend or give, and thus did not constitute an effective means to prevent the pivotal action referred to. By reason of the fact that with this old construction it was necessary to have the lens bear firmly against the mounting or its projecting arms it was necessary that the hole in the lens and the holes in the ears or straps of the mounting should be drilled with a great degree of accuracy in order that they should register one with the other and at the same time provide the necessary firm bearing of the edge of the lens against the mounting or projecting arms. It has been found very difficult to secure the required degree of accuracy in drilling the parts to insure the firm bearing required. To secure the necessary degree of accuracy involves the expenditure of much time and care, thus increasing the cost, and when, as often happens, the requisite firm bearing is not obtained the lens is not properly held against pivotal action.

The object of the present invention is to overcome the objections above referred to and to provide means for securing the lens to its mounting which will insure a firm connection and hold the lens securely against pivotal action.

To that end the invention consists in a mounting provided with a strap or ear adapted to extend on one side of the lens and to be attached to the lens at two different points of attachment and to the combination of a lens with such a mounting.

Figure 2:
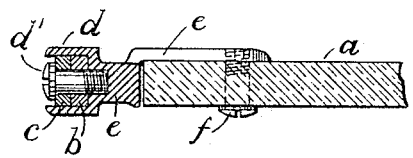
Figure 3:
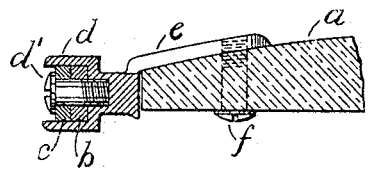
Figure 4:
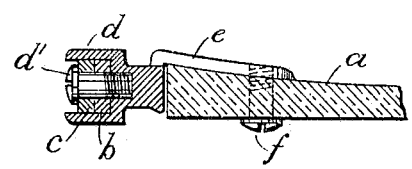
Figure 5:
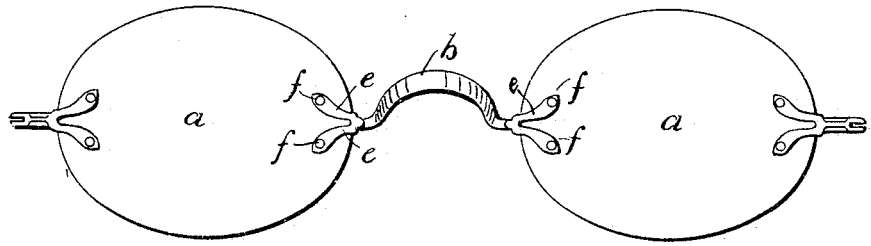

Referring to the drawings, Figure 1 is a rear view of a pair of eyeglasses embodying my invention. Figs. 2, 3, and 4 are enlarged sectional views showing the invention applied to different forms of lenses, and Fig. 5 is a front view of a pair of spectacles embodying my invention.

In the eyeglasses shown in Fig. 1, $a\ a$ represent the lenses, $b$ the bow-spring, and $c\ c$ the nose-guards. $d\ d$ represent the posts, in the outer ends of which the bow-spring and nose-guard are clamped by the screw $d'$ in the usual manner. As the two posts $d\ d$ are of the same construction, it will be sufficient to describe one of them. The post $d$ instead of being provided with two projecting straps or ears to go one on each side of the lens, as heretofore, has a projecting strap or ear $e$ to go on one side only of the lens. Preferably this strap or ear is forked or divided into two members, as shown in the drawings. The lens *a* is secured to the post *d* by two screws *f f*, located one near the end of each of the two members of the ear *e*, said screws passing through the lens and being screwed into the metal of the ear. By this construction there are two points of engagement between the ear of the post and the lens, or, in other words, the lens is anchored at two points. The lens is thus firmly and securely attached to the post, and all liability of any pivotal action of the lens is avoided, and this result is accomplished without the necessity of employing any arms or projections to embrace the periphery of the lens and without the necessity of any bearing of the edge of the lens against the end of the post. By reason of this no especial pains is required to be employed in drilling the holes in the lens and in the ear of the post in order that they shall be in alinement and the lens at the same time be firmly seated against the end of the post. As it is not necessary for the edge of the lens to bear firmly against the end of the post, it is not important that the lens should have any precise and definite location with relation to the post, and if it is found when the lens is placed in position that the holes in the lens and the ear, respectively, do not register exactly they can readily be made to register by simply adjusting the lens toward or from the post, as required. Provision for adjusting the lens toward the post is indicated in Fig. 2 by the space between the edge of the lens and the end of the post.

If desired, the strap or ear *e* may be made solid instead of being forked or formed in two prongs. It is preferred, however, to form the ear with two prongs or members, as shown, as thereby a further means of adjustment is afforded. Thus these two prongs or members may be readily bent so as to move their free ends and the holes therein nearer together or farther apart, thereby facilitating the registering of the holes in the prongs with the holes in the lens in that direction.

While it is preferred to employ two screws to secure the lens to the post, it is evident that, if desired, only one screw need be employed, the ear of the post being provided simply with a steady-pin to engage the other hole in the lens.

The construction described will be found especially useful in securing mountings to lenses of varying shapes—as, for instance, in the case of a lens of considerable convexity, as shown in Fig. 3, or one of considerable concavity, as shown in Fig. 4. With the mountings as heretofore constructed the bending of the ears necessary to make the same conform to the shape of the lens served to change the location of the holes in the ears with relation to the hole in the lens, and different mountings were required for different shaped lenses. By reason of the facility for adjustment provided by the present invention the same post or other mounting may be employed with any shaped lens and different mountings are not required for different lenses. Any change in the relative location of the hole in the ear of the post due to bending the same inward or outward to fit a concave or a convex lens may readily be compensated for and the holes in the ear made to register with the holes in the lens by the adjustment of the parts above referred to.

In Fig. 5 the invention is shown as applied to the bridge-piece of a pair of spectacles and also to the end pieces to which the temples are pivoted.

While it is preferred to construct the mounting with a single strap or ear adapted to extend on one side only of the lens, it is to be understood that the invention might likewise be employed in a mounting which had two straps or ears adapted to extend one on each side of the lens. The gist and essence of the invention consists in attaching the lens to the mounting at two points of attachment, whereby the lens may be firmly secured to the mounting and pivotal movement of the lens avoided without the employment of any projecting arms to embrace the periphery of the lens and without any bearing of the edge of the lens against the mounting. The employment of this construction renders it possible to employ a mounting having a single ear to extend on one side only of the lens; but it is manifest that a mounting having a second ear to extend on the other side of the lens, the construction remaining otherwise the same, would equally embody and involve the characteristic features of the invention.

What I claim as my invention, and desire to secure by Letters Patent, is—

1. A mounting for eyeglasses or spectacles comprising a body portion, and a projecting strap or ear adapted to extend on one side of the lens and to be attached to the lens at two points of attachment by means passing through the lens, substantially as described.

2. A mounting for eyeglasses or spectacles comprising a body portion and a projecting bifurcated strap or ear adapted to extend on one side of the lens and to be attached to the lens at two points of attachment by means passing through the lens, substantially as described.

3. The combination, with the lens of a pair of eyeglasses or spectacles, of a mounting comprising a body portion and a projecting strap or ear extending on one side of the lens and attached to the lens at two points of attachment by means passing through the lens, substantially as described.

FREDERICK A. STEVENS.

Witnesses:
W. H. THURSTON,
J. H. THURSTON.